United States Patent
Redford

(10) Patent No.: US 9,952,418 B2
(45) Date of Patent: Apr. 24, 2018

(54) MULTI-CHANNEL SIMULTANEOUS PHOTOSTIMULATION

(71) Applicant: INTELLIGENT IMAGING INNOVATIONS, INC., Denver, CO (US)

(72) Inventor: Glen Ivan Redford, Arvada, CO (US)

(73) Assignee: INTELLIGENT IMAGING INNOVATIONS, INC., Denver, CO (US)

( * ) Notice: Subject to any disclaimer, the term of this patent is extended or adjusted under 35 U.S.C. 154(b) by 0 days.

(21) Appl. No.: 14/212,371

(22) Filed: Mar. 14, 2014

(65) Prior Publication Data

US 2014/0268263 A1   Sep. 18, 2014

Related U.S. Application Data

(60) Provisional application No. 61/798,185, filed on Mar. 15, 2013.

(51) Int. Cl.

| G02B 21/06 | (2006.01) |
| G03H 1/00 | (2006.01) |
| G03H 1/22 | (2006.01) |
| G02B 27/14 | (2006.01) |
| G03H 1/30 | (2006.01) |

(52) U.S. Cl.
CPC ............ *G02B 21/06* (2013.01); *G03H 1/0005* (2013.01); *G03H 1/2294* (2013.01); *G02B 27/14* (2013.01); *G03H 1/30* (2013.01); *G03H 2222/13* (2013.01); *G03H 2225/60* (2013.01)

(58) Field of Classification Search
CPC ...... G02B 21/00; G02B 21/06; G03H 1/0005; G03H 1/02; G03H 1/10
USPC ............... 359/368, 376, 383, 385, 389, 7, 9
See application file for complete search history.

(56) References Cited

U.S. PATENT DOCUMENTS

| 5,729,245 A | 3/1998 | Gove et al. |
| 5,914,802 A | 6/1999 | Stappaerts et al. |
| 2003/0021016 A1* | 1/2003 | Grier .................. G02B 21/0036 359/368 |
| 2004/0008397 A1 | 1/2004 | Noonan |
| 2004/0047030 A1 | 3/2004 | MacAulay |

(Continued)

FOREIGN PATENT DOCUMENTS

WO    WO 2013130077 A1 *   9/2013  ............. G02B 21/06

OTHER PUBLICATIONS

Volodymyr Nikolenko et al, "SLM microscopy: Scanless two-photon imaging and photostimulation with spatial light modulators", Frontiers in Neural Circuits, vol. 2, Article 5, Dec. 19, 2008, p. 1-15.*

(Continued)

*Primary Examiner* — Bumsuk Won
*Assistant Examiner* — Ephrem Mebrahtu
(74) *Attorney, Agent, or Firm* — Jason H. Vick; Sheridan Ross, PC

(57) ABSTRACT

A photomanipulation device is described that includes multiple spatial light modulators (SLMs). By having more than one SLM, this device can simultaneously photomanipulate different areas with different wavelengths and/or it can rapidly switch between different areas with speeds faster than a single device is capable of. This device is particularly useful for photostimulation of neurons where simultaneity and precision timing is required.

20 Claims, 5 Drawing Sheets

(56) References Cited

U.S. PATENT DOCUMENTS

| | | | |
|---|---|---|---|
| 2008/0068709 A1* | 3/2008 | Zimmermann | G02B 21/0076 359/385 |
| 2009/0116518 A1* | 5/2009 | Patel | H04J 14/02 372/23 |
| 2009/0268280 A1 | 10/2009 | Osawa et al. | |
| 2009/0303571 A1 | 12/2009 | Sandstrom | |
| 2011/0069382 A1* | 3/2011 | Toomre | G01N 21/648 359/388 |
| 2011/0109958 A1* | 5/2011 | Yokoi | G02B 21/0032 359/363 |
| 2011/0267663 A1 | 11/2011 | Murayama | |
| 2012/0135535 A1* | 5/2012 | Grier | G01N 15/1475 436/164 |
| 2014/0368904 A1 | 12/2014 | Moertelmaier et al. | |

OTHER PUBLICATIONS

International Search Report for corresponding International Application No. PCT/US14/28301, dated Aug. 7, 2014.
Written Opinion for corresponding International Application No. PCT/US14/28301, dated Aug. 7, 2014.
International Preliminary Report on Patentability for corresponding International Application No. PCT/US14/28301, dated Oct. 22, 2015.

\* cited by examiner

MULTI-CHANNEL SIMULTANEOUS PHOTOSTIMULATION

RELATED APPLICATION DATA

This application claims the benefit of and priority under 35 U.S.C. § 119(e) to U.S. Patent Application No. 61/798,185, filed Mar. 15, 2013, entitled "Multi-channel Simultaneous Photostimulation," which is incorporated herein by reference in its entirety.

RELATED ART

U.S. Pat. No. 5,914,802—Combined spatial light modulator and phase mask for holographic storage system. A light modulator for both intensity and phase modulating coherent light on a pixel-by-pixel basis includes a modulating material responsive to an electric potential for modulating the intensity of coherent light passing through the modulating material, and electrodes for applying an electric potential across the modulating material on a pixel-by-pixel basis. The coherent light associated with a first set of pixels has a different optical path length through the modulating material than does the coherent light associated with a second set of pixels. The modulating material is a liquid crystal material. The electrodes include a set of first reflective pixel electrodes embedded in the liquid crystal material, the first reflective pixel electrodes having a first thickness, and a set of second reflective pixel electrodes embedded in the liquid crystal material, the second reflective pixel electrodes having a second thickness. The coherent light associated with the first set of pixels is reflected by the first reflective pixel electrodes, and the coherent light associated with the second set of pixels is reflected by the second reflective pixel electrodes. The reflective surfaces of the first reflective pixel electrodes are embedded in the liquid crystal material a different amount than are the reflective surfaces of the second reflective pixels. In particular, the first reflective pixel electrodes are a different thickness than the second reflective pixel electrodes.

U.S. Pat. No. 5,729,245—Alignment for display having multiple spatial light modulators. A method and structure for a display system having multiple spatial light modulators (SLMs) (16), each of which contributes an image of one color that is perceived by the viewer as a combined image. The SLMs (16) have more rows and columns of pixel elements (42) than rows or columns of pixel data to be displayed. A window of "active" pixel elements (42) can be shifted up and down or right and left by selecting which pixel elements (42) are to receive data. The addressing circuit (31, 31a, 35, 35a) of each SLM 16 can be controlled so as to accomplish this shifting.

US 20040008397—Electro-optic phase-only spatial light modulator. An electro-optic, phase-only spatial light modulator is disclosed which uses an electro-optic wafer, such as lithium niobate (LiNbO3) or lead-lanthanum-zirconate-titanate (PLZT). The electro-optic wafer is sandwiched between a transparent top electrode that forms a solid ground plane and a bottom electrode that is segmented into an array of electrode pads. Voltage source circuitry for each electrode is located immediately beneath the electrode. When a voltage is applied across the electrodes, an electrostatic field is generated between the conductors, and the refractive index of the electro-optic wafer changes slightly. The spatial light modulator can also include a totally reflecting dielectric mirror on the bottom face of the electro-optic wafer and a partially reflecting dielectric mirror deposited on the top face. Together, the mirrors and wafer form an asymmetric Fabry-Perot cavity. This resonant cavity enhances the effect that the small changes in the wafer's refractive index has, resulting in phase shifts of $\pm\frac{1}{2}\pi$ in the reflected light.

Because the bottom electrode is segmented, a different voltage can be applied to each electrode. Thus, the refractive index, and therefore the phase of the exiting light wave, can be manipulated to vary with position. In this way, the phase of the outgoing optical wavefront is spatially modulated. The voltage source integrated circuitry for each electrode is located immediately behind the electrode pad. This integrated circuitry is fabricated on a separate silicon wafer that is later bonded to the electro-optic wafer.

BACKGROUND

A growing number of microscopy experiments involve photomanipulation where light is directed to a subset of the sample that is being imaged. For example, a field of labeled cells could be imaged where it is desirable that one of the many cells is illuminated with a specific wavelength of light while the other cells are not. Fluorescence recovery after photobleaching (FRAP) would be a common example of this technique. Other examples include photo-uncaging, photo-stimulation, ablation, photo-wounding, or limiting the excitation field so that some parts of the imaged field are excluded. There are several available devices for building a photomanipulation system, the most common being galvo-scanners, digital light projectors (DLP), and spatial light modulators (SLM)—hereafter referred to as projection devices.

In specific fields of microscopy, for example optogenetics, there is a need to simultaneously illuminate several spots. A scanning system is inconvenient for this because it would require a different scanner for each spot. The only current commercially available products are DLP and SLM devices that can accomplish this task.

A DLP device masks unwanted areas from being illuminated by redirecting the light from those areas. This means that the intensity at any one spot is the intensity of the input illumination divided by the fraction of the area of the spot. This means that for any given input illumination, the relative intensity is low at one spot. DLP devices have the advantage however that they always have uniform intensity density regardless of the area being illuminated.

SLM devices have nearly opposite characteristics. When illuminating a single spot, all of the input illumination goes to that spot, that is, the total intensity remains the same regardless of the illuminated area. However, in SLM devices, the intensity density is dependent on the area.

For certain applications, significant power is needed at a spot to cause the desired photomanipulation. DLP devices with any practical input illumination are unable to provide the required intensity density. Thus for certain applications an SLM device is desired.

For even more specific applications, there may be a need for multiple wavelength photomanipulation. For DLP and SLM projection devices this means that a separate device is used for each desired wavelength.

For other specific applications, there is required fast, precise timing between illumination of several spots. For example, one neuron needs to be stimulated exactly 1 millisecond after another neuron is stimulated. This means that the light pattern must change within that millisecond. Unfortunately, most available commercial SLM devices cannot change their patterns that fast.

An exemplary embodiment describes an SLM device that can simultaneously illuminate different spots with different wavelengths. The exemplary embodiment can also illuminate different spots with fast precise timing between the different illumination patterns.

FIELD

An exemplary embodiment generally relates to photomanipulation in optical microscopes. More specifically, an exemplary embodiment relates to a spatial light modulator device for photomanipulation. Even more specifically, an exemplary embodiment relates to a photomanipulation device that can simultaneously illuminate different spots with different wavelengths or illuminate different spots with fast, precise timing between them.

SUMMARY

A SLM device is generally illuminated by collimated light and the reflected light beam from the SLM has the phase information of the hologram pattern on the SLM. This reflected beam, when focused, will create a real hologram at the focal point of the lens. This hologram is then made coincident with the image plane of the microscope such that the hologram is relayed to the sample.

In order to have a multi-channel device (a multi-wavelength device), separate SLM devices need to be illuminated individually by their separate single wavelengths. Alternatively, different regions of the same SLM can be illuminated by different wavelengths, the several regions acting as different SLM devices. At some point in the optical train, the separate reflection beams must be combined to form a single hologram of multiple wavelengths. Ideally this is done in the places in the optical train where the beam is collimated, that is before the imaging lens or in some other collimated space created by an additional relay.

As the several reflected beams have different wavelengths, they can be combined by means of a dichroic, or filter(s) that reflects/transmits different wavelengths. Two beams could be combined by a polarizing beamsplitter by having the reflected beams be cross-polarized. A prism could also be used to combine beams of different wavelengths. Once the beams are combined, the multi-wavelength hologram could then be relayed through the microscope.

If instead the goal was to provide rapid switching between holograms—as in the case of needing fast, precise timing between stimulating different regions, then the several SLM devices would be illuminated by the same wavelength of light. Combining the several beams could be done with a polarizing beamsplitter for two devices, but more devices would require a galvanometer or other high speed switching device.

The hologram generated by an SLM usually has several artifacts. Of these, the most prominent are the zero order and the addressable area.

The zero order is a spot exactly in the center of the hologram that is created by direct reflections from the SLM or any light that is improperly phased. One method of removing the zero order from the hologram is to use a beam block device that blocks only the very center of the hologram and passes everything else on. This leaves a small unusable area in the center of the field. This beam block is placed in the focal point of the lens (that is in the image plane).

The addressable area is the full extent of possible holograms generated by the SLM. It is dependent on the optical system, the geometry of the SLM, and the wavelength of light. So for any given device, the addressable area will change with the wavelength. Outside of the addressable area are usually other artifacts such as higher orders. It is desirable that these be eliminated. The easiest way to mask off anything outside of the addressable area is to use an aperture sized to exactly match the addressable area. This can be combined with the beam block discussed above to form a device that removes most of the artifacts from an SLM hologram.

Unfortunately, the addressable area changes with wavelength so that the aperture must be different for the different wavelengths. There are several ways to solve this problem, but one simple way is to have a separate aperture for each wavelength and then combine the reflected beams later in the optical path (for example in a second relay).

One exemplary apparatus can comprise:
  more than one SLM projection device, or alternatively a single SLM device divided into more than one area to act as more than one SLM device;
  more than one illumination beam for illuminating the several SLM devices;
  an optical system for combining the reflected beams from the SLM devices; and
  a microscope for delivering the generated hologram to a sample.

This apparatus when combined would constitute a multi-wavelength SLM device or a SLM device capable of rapidly switching the hologram.

This device has one advantage of being able to simultaneously photomanipulate different spots with different wavelengths or different regions with fast, precise timing.

Aspects of the invention are thus directed toward photomanipulation in optical microscopes.

Still further aspects of the invention are directed toward a spatial light modulator device for photomanipulation.

Even further aspects of the invention are directed toward to a photomanipulation device that can simultaneously illuminate different spots with different wavelengths or different spots with fast, precise timing.

Still further aspects of the invention are directed toward an optical system for combining the holograms from several different SLM devices at different wavelengths into a single multi-wavelength hologram.

Still further aspects of the invention relate to an apparatus for a multi-wavelength SLM device comprising:
  more than one SLM projection device, or alternatively a single SLM device divided into more than one area to act as more than one SLM device;
  more than one illumination beam for illuminating the several SLM devices;
  an optical system or means for combining the reflected beams from the SLM devices; and
  a microscope for delivering the generated hologram to a sample.

The aspect above, where the means for recombining the reflected beams comprises one or more dichroic devices.

The aspect above, where the means for recombining comprises a prism or prisms.

The aspect above, where the means for recombining is a polarizing beam splitter.

The aspect above, where the means for recombining is a galvanometer or other fast switching device.

The aspect above, where one or more of the SLM devices are illuminated by different wavelengths in different areas of the SLM(s) such that the different areas are in effect separate SLM devices.

The aspect above, where the apparatus is attached to an optical microscope.

The aspect above, where the apparatus is combined with an electronic imaging device such as a camera.

The aspect above, where the apparatus is combined with a scanning microscope.

The aspect above, where the scanning microscope is a confocal microscope.

The aspect above, where the scanning microscope is a multi-photon microscope.

The aspect above, where the apparatus is automated and controlled with a computer program.

The aspect above, where the device is used to photo-stimulate neurons in a live tissue.

Another exemplary aspect is directed toward using a large area high resolution SLM, and selectively illuminating a portion of the SLM to enable fast switching between patterns.

These and other features and advantages of this invention are described and, or are apparent from, the following detailed description of the exemplary embodiment.

BRIEF DESCRIPTION OF THE DRAWINGS

The exemplary embodiments of the invention will be described in detail, with reference to the following figures wherein.

DETAILED DESCRIPTION

The exemplary embodiments of this invention will be described in relation to microscopes, imaging systems, and associated components. However, it should be appreciated that, in general, known components will not be described in detail. For purposes of explanation, numerous details are set forth in order to provide a thorough understanding of the present invention. It should be appreciated however that the present invention may be practiced in a variety of ways beyond the specific details set forth herein.

Figure 1:
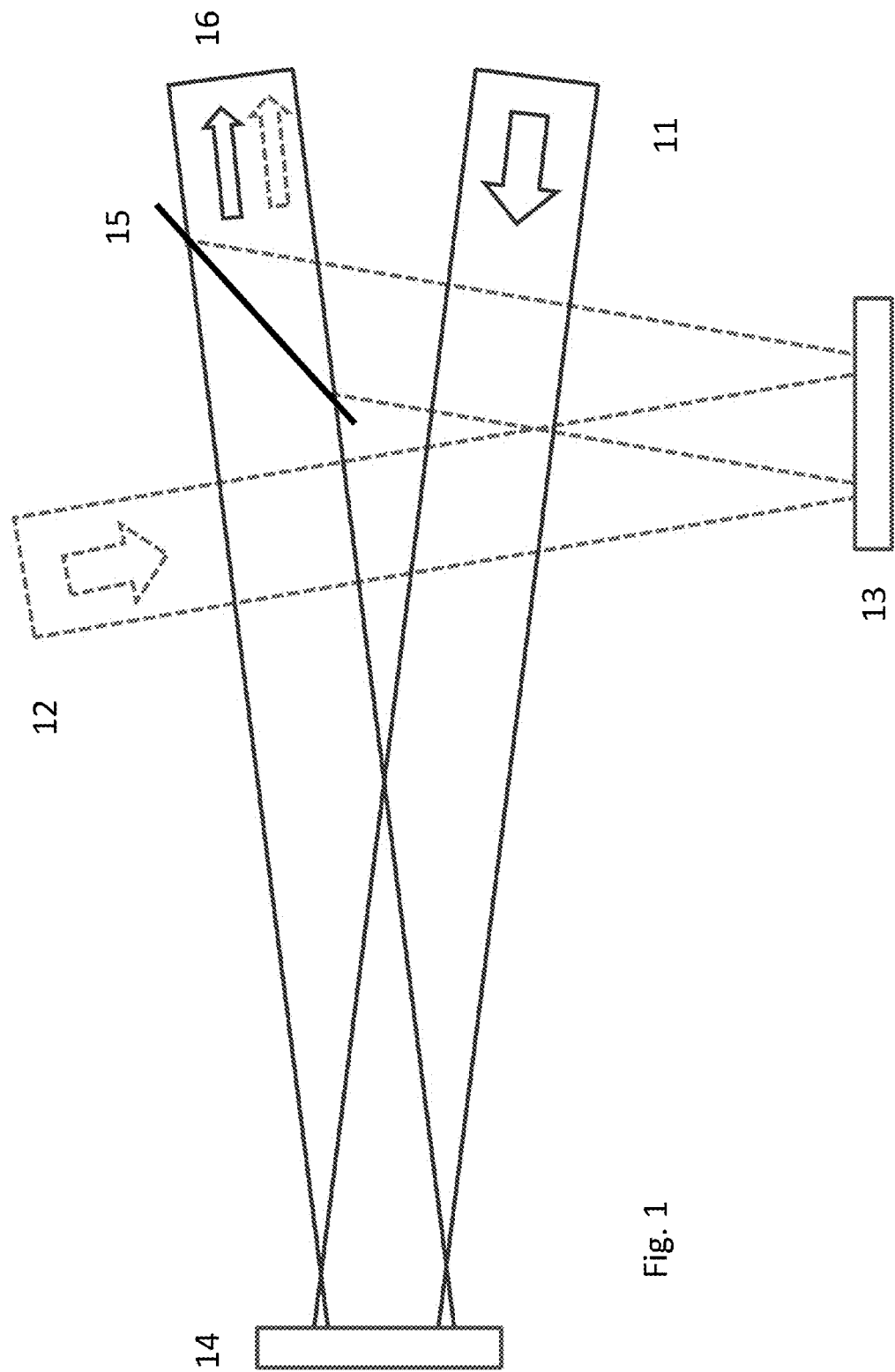
FIG. 1 illustrates an exemplary embodiment of a SLM photomanipulation apparatus wherein two SLMs with different wavelengths are combined into a single output beam.

FIG. 1 illustrates an exemplary embodiment of a SLM photomanipulation apparatus wherein two SLMs with different wavelengths are combined into a single output beam. The input light beam 11 is of a different wavelength or different timing from the input light beam 12. These light beams are reflected off of the SLM devices, 13 and 14 respectively, at a low angle. The two output beams that have separate hologram information are then later combined by some optical means 15. The combined output beam 16 has the overlaid information from both holograms.

Figure 2:
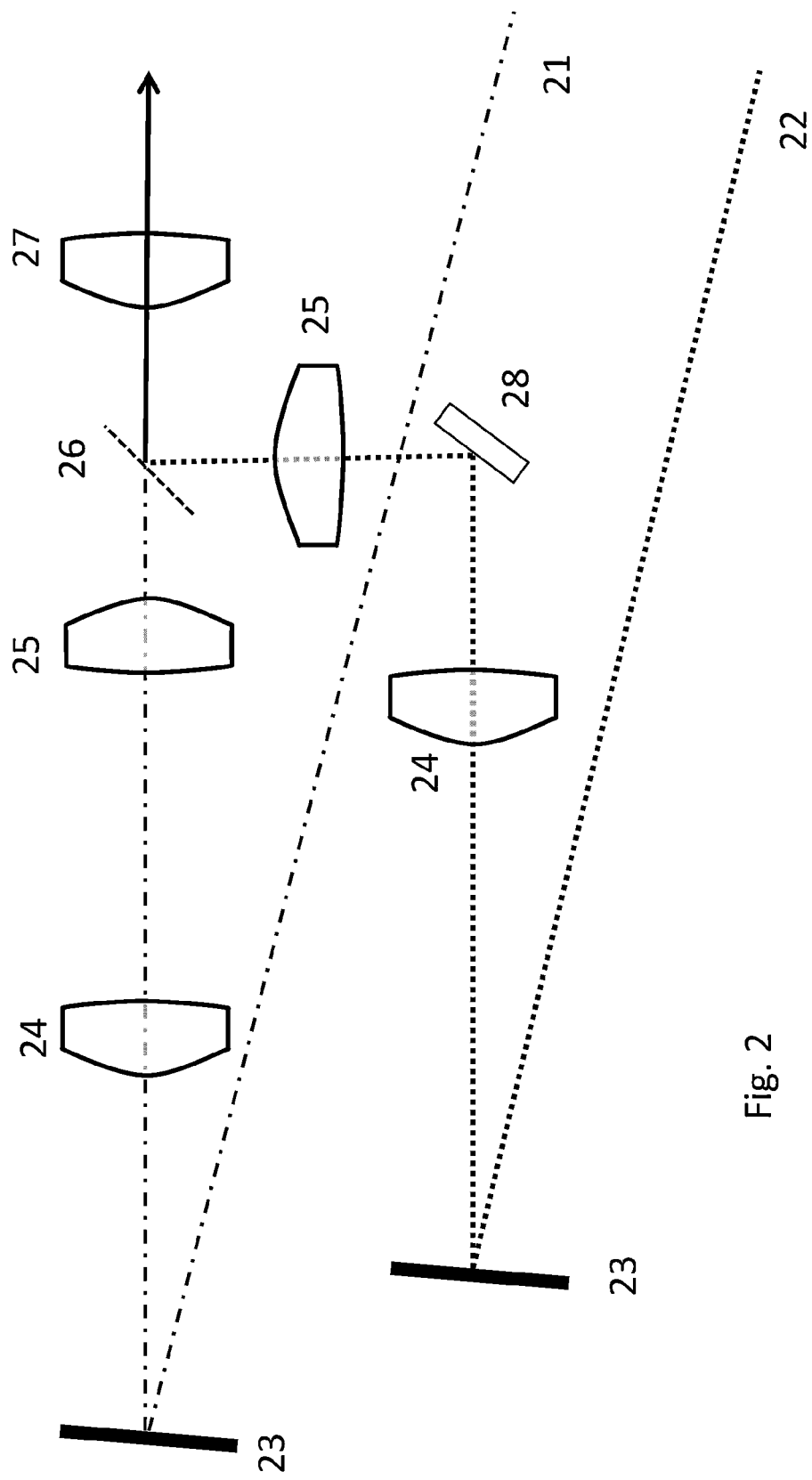
FIG. 2 illustrates an exemplary embodiment of a SLM photomanipulation device where two SLM devices are recombined in a secondary infinite space by means of a color dichroic.

FIG. 2 illustrates an exemplary embodiment of a SLM photomanipulation device where two SLM devices are recombined in a secondary infinite space by means of a color dichroic. The two input beams 21 and 22 are of different wavelengths. As in FIG. 1, the input beams are reflected at a low angle off of the SLMs 23. The holograms are separately formed by the lenses 24. These holograms are then relayed to infinite by lenses 25. The two beams are combined by a color dichroic 26. The holograms are reformed by lens 27. There may be need of directing optics such as the mirror 28 as the geometry may require. In FIG. 2, two SLMs are represented, but this design is extendable to any number of SLMs that are combined in the infinite space shown.

Figure 3:
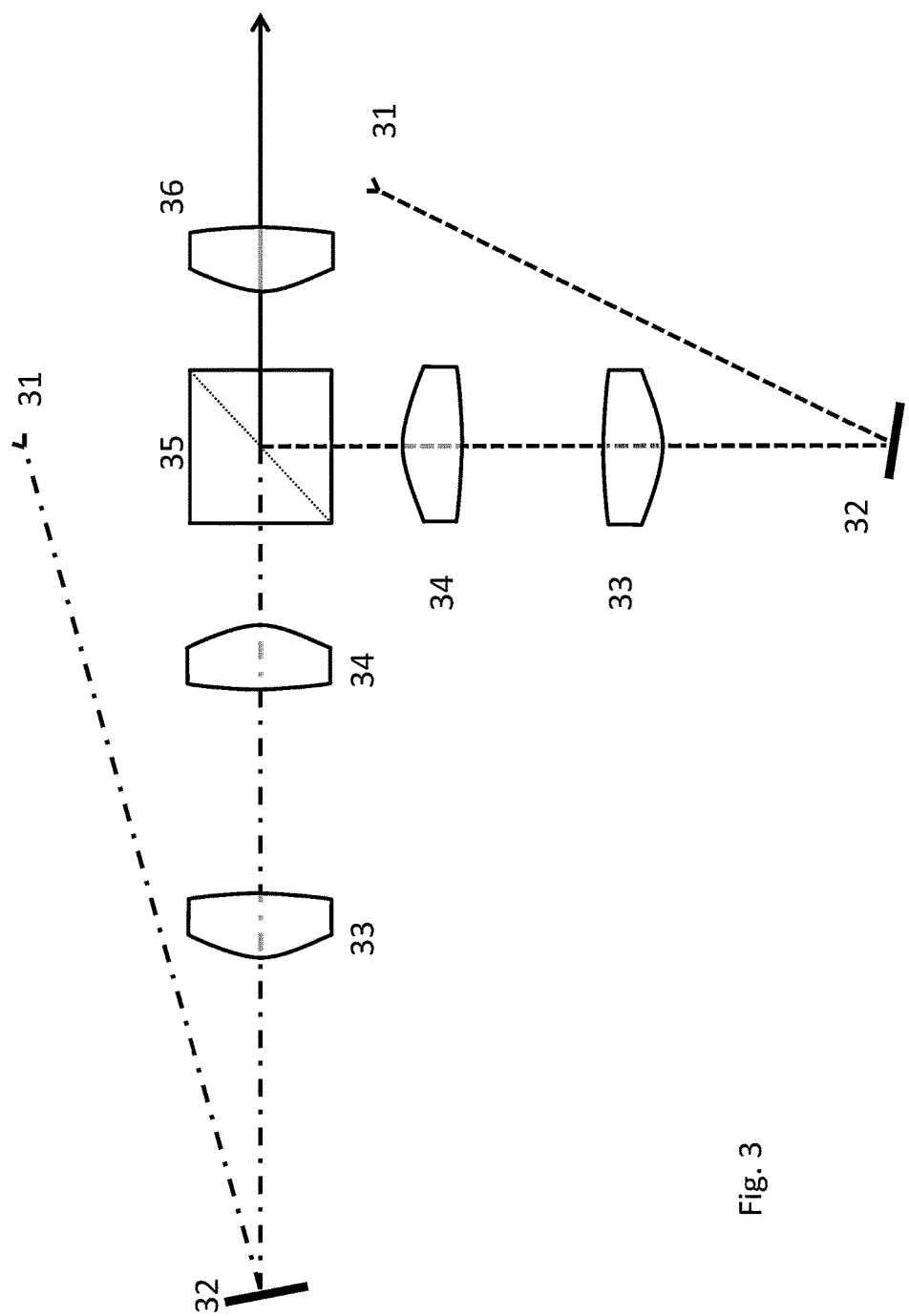
FIG. 3 illustrates an exemplary embodiment of a SLM photomanipulation device where two SLM devices are recombined in a secondary infinite space by means of a polarizing beam splitter.

FIG. 3 illustrates an exemplary embodiment of a SLM photomanipulation device where two SLM devices are combined in a secondary infinite space by means of a polarizing beam splitter. The two input beams that differ in wavelength or timing 31 are reflected off of SLMs 32 at a low angle. The holograms are formed by the lenses 33 and then relayed to infinite by lenses 34. The separate beams are combined by means of a polarizing beamsplitter (the two SLMs are illuminated by beams that are cross polarized) 35. The holograms are reformed by lens 36.

Figure 4:
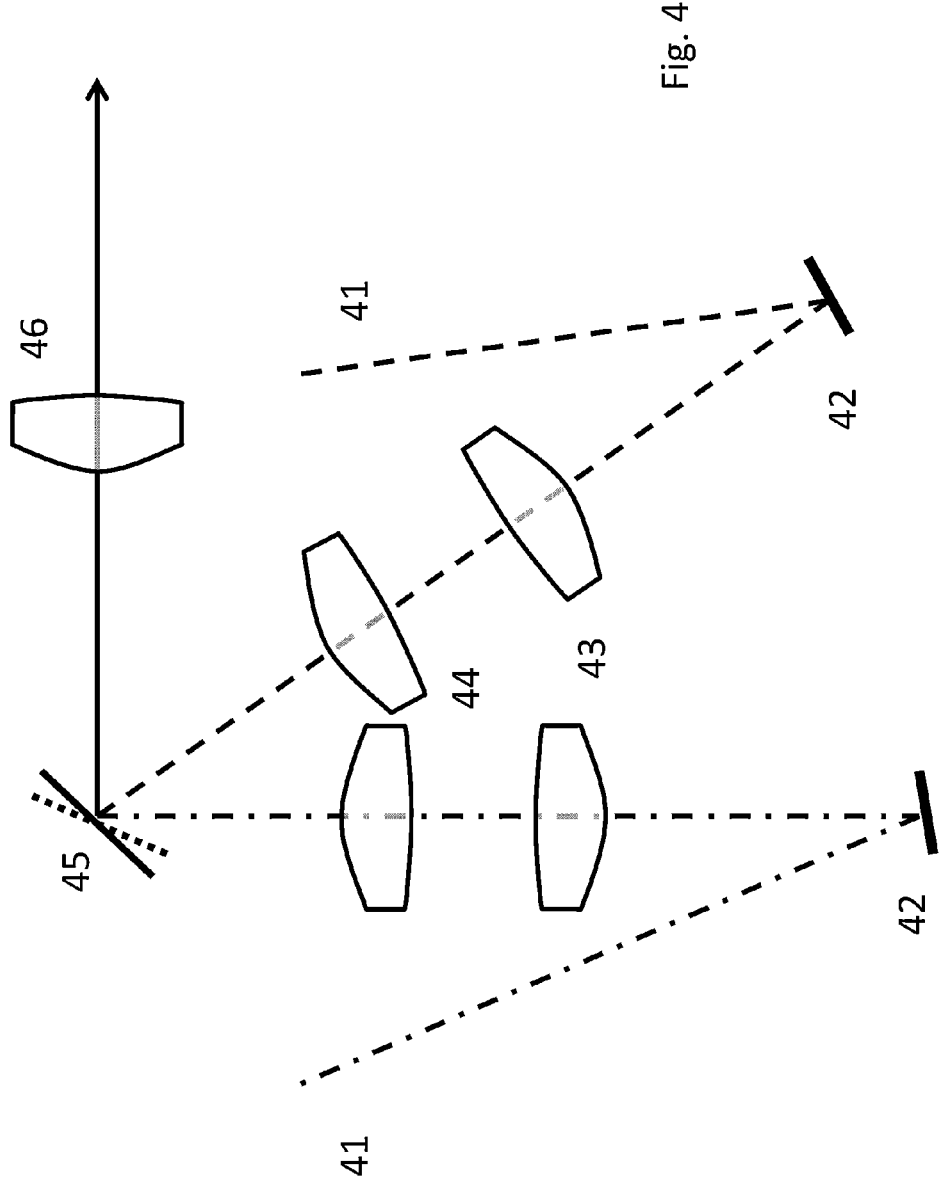
FIG. 4 illustrates an exemplary embodiment of a SLM photomanipulation device where two SLM devices are recombined in a secondary infinite space by means of a galvanometer.

FIG. 4 illustrates an exemplary embodiment of a SLM photomanipulation device where two SLM devices are combined in a secondary infinite space by means of a galvanometer. The two input beams 41 illuminate the two SLMs 42. Lenses 43 and 44 are used to generate an infinite beam from the two SLMs onto the galvanometer 45 in the same manner as FIGS. 2 and 3. The galvanometer redirects the two beams to overlay and the combined hologram is created by lens 46. Only two SLM devices are shown in this figure, but in general this method could be used to combine more than two SLM beams.

Figure 5:
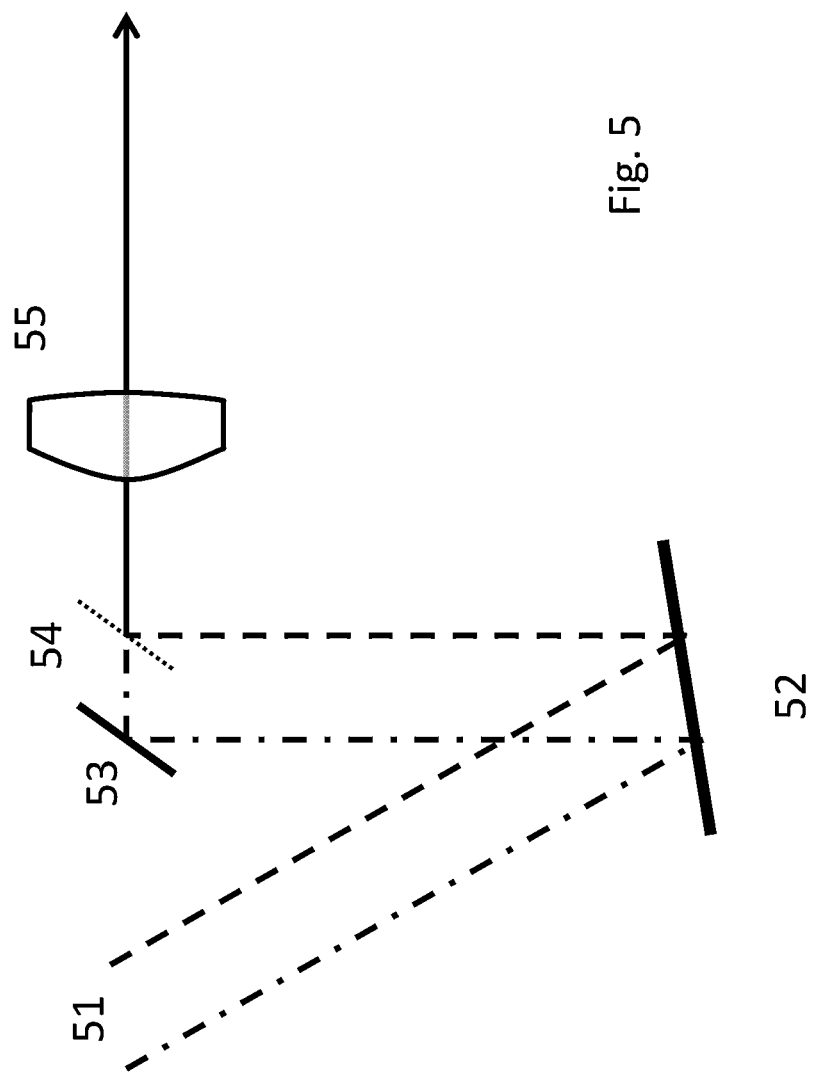
FIG. 5 illustrates an exemplary embodiment of a SLM photomanipulation device where a single SLM device is separately illuminated by two input beams in different areas of the SLM. These two beams are recombined to form a single beam.

FIG. 5 illustrates an exemplary embodiment of a SLM photomanipulation device where a single SLM device is separately illuminated by two input beams in different areas of the SLM. These two beams are combined to form a single beam. The input beams 51 differ in wavelength or timing and separately illuminate different areas of the SLM 52. The separate beams are combined by means of a mirror 53 and dichroic or beamsplitter 54. The combined beam forms a combined hologram after lens 55. This allows a single SLM device to be used as if it where multiple SLM devices as in FIGS. 1 and 2.

The exemplary techniques illustrated herein are not limited to the specifically illustrated embodiments but can also be utilized with the other exemplary embodiments and each described feature is individually and separately claimable.

The systems of this invention can cooperate and interface with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, any comparable means, or the like.

Furthermore, the disclosed control methods and graphical user interfaces may be readily implemented in software using object or object-oriented software development environments that provide portable source code that can be used on a variety of computer or workstation platforms. Alternatively, the disclosed control methods may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

It is therefore apparent that there has been provided, in accordance with the present invention, a photomanipulation device. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

The invention claimed is:

1. A photomanipulation system for optical microscopes comprising:
    a plurality of SLM (Spatial Light Modulator) photomanipulation devices, wherein the photomanipulation devices provide one or more of fluorescence recovery after photobleaching, photo-uncaging, photo-stimulation, ablation, photo-wounding, and/or limiting an excitation field so that some parts of an imaged field are excluded;
    more than one input beam of light, each respective input beam of light projected onto one of the SLM photomanipulation devices, wherein the input beams differ in one or more of wavelength and timing;
    an optical system adapted to combine reflected beams of light from the respective SLM devices, wherein the reflected beams differ in one or more of wavelength and timing; and
    a microscope adapted to deliver a multi-wavelength hologram of the combined reflected beams of light to a sample, wherein the system provides simultaneous photomanipulation of: different spots of a sample with different wavelengths, or different regions of the sample with precise timing.

2. The system of claim 1, where separate areas of a single SLM device act as the several SLM devices.

3. The system of claim 1, wherein the optical system that combines the reflected beams comprises color dichroics.

4. The system of claim 1, wherein the optical system that combines the reflected beams comprises a polarizing beamsplitter.

5. The system of claim 1, wherein the optical system that combines the reflected beams comprises a galvanometer.

6. The system of claim 1, wherein the combining of the reflected beams happens in a secondary infinite space created by relay lenses.

7. The system of claim 2, wherein the optical system that combines the reflected beams comprises color dichroics.

8. The system of claim 2, wherein the optical system that combines the reflected beams comprises a galvanometer.

9. The system of claim 2, wherein the combining of the reflected beams happens in a secondary infinite space created by relay lenses.

10. The system of claim 1, wherein the combined hologram is used to generate multi-photon events.

11. A photomanipulation system for optical microscopes comprising:
    a plurality of SLM (Spatial Light Modulator) photomanipulation devices, wherein the photomanipulation devices provide one or more of fluorescence recovery after photobleaching, photo-uncaging, photo-stimulation, ablation, photo-wounding, and/or limiting an excitation field so that some parts of an imaged field are excluded;
    more than one input beam of light, each respective input beam of light projected onto one of the SLM photomanipulation devices, wherein the input beams differ in one or more of wavelength and timing;
    an optical device adapted to combine reflected beams of light from the respective SLM devices, wherein the reflected beams differ in one or more of wavelength and timing; and
    means for delivering a multi-wavelength hologram of the combined reflected beams of light to a sample, wherein the system provides simultaneous photomanipulation of: different spots of a sample with different wavelengths, or different regions of the sample with precise timing.

12. The system of claim 11, where separate areas of a single SLM device act as the several SLM devices.

13. The system of claim 11, wherein the optical device that combines the several beams comprises color dichroics.

14. The system of claim 11, wherein the optical device that combines the several beams comprises a polarizing beamsplitter.

15. The system of claim 11, wherein the optical device that combines the several beams comprises a galvanometer.

16. The system of claim 11, wherein the combining of the reflected beams happens in a secondary infinite space created by relay lenses.

17. A photomanipulation system comprising:
    a plurality of SLM (Spatial Light Modulator) photomanipulation devices, wherein the photomanipulation devices provide one or more of fluorescence recovery after photobleaching, photo-uncaging, photo-stimulation, ablation, photo-wounding, and/or limiting an excitation field so that some parts of an imaged field are excluded;
    a plurality of input beams of light projected onto respective ones of the SLM photomanipulation devices, wherein each input beams differ in one or more of wavelength and timing from the other input beams;
    an optical device adapted to combine reflected beams of light from each of the respective SLM devices, wherein the reflected beams differ in one or more of wavelength and timing; and
    a microscope adapted to deliver a single multi-wavelength hologram of the combined reflected beams of light to a sample, wherein the system provides simultaneous photomanipulation of: different spots of a sample with different wavelengths, or different regions of the sample with precise timing.

18. The system of claim 17, wherein the optical device comprises color dichroics.

19. The system of claim 17, wherein the optical device comprises a polarizing beamsplitter.

20. The system of claim 17, wherein the optical device comprises a galvanometer.

* * * * *